US008967713B2

(12) United States Patent
Izumida et al.

(10) Patent No.: US 8,967,713 B2
(45) Date of Patent: Mar. 3, 2015

(54) VEHICLE SEAT

(71) Applicant: NHK Spring Co., Ltd., Yokohama-shi (JP)

(72) Inventors: Osamu Izumida, Yokohama (JP); Atsushi Kageyama, Yokohama (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 110 days.

(21) Appl. No.: 13/655,285

(22) Filed: Oct. 18, 2012

(65) Prior Publication Data
US 2013/0099532 A1 Apr. 25, 2013

(30) Foreign Application Priority Data

Oct. 25, 2011 (JP) ................................. 2011-234137

(51) Int. Cl.
B60N 2/42 (2006.01)
B60N 2/22 (2006.01)
B60N 2/68 (2006.01)
B60N 2/427 (2006.01)

(52) U.S. Cl.
CPC ........ B60N 2/22 (2013.01); B60N 2/686 (2013.01); B60N 2/4228 (2013.01); B60N 2/42709 (2013.01)
USPC .................................................... 297/216.14

(58) Field of Classification Search
USPC ........................................ 297/216.13, 216.14
See application file for complete search history.

(56) References Cited

U.S. PATENT DOCUMENTS

| 3,501,200 | A | * | 3/1970 | Ohta | 297/452.19 |
| 6,709,053 | B1 | * | 3/2004 | Humer et al. | 297/216.1 |
| 6,786,543 | B2 | * | 9/2004 | Andersson et al. | 297/216.13 |
| 2008/0258519 | A1 | * | 10/2008 | Niitsuma et al. | 297/216.13 |
| 2010/0187893 | A1 | * | 7/2010 | Yamada et al. | 297/452.18 |
| 2013/0119723 | A1 | * | 5/2013 | Nitsuma | 297/216.13 |

(Continued)

FOREIGN PATENT DOCUMENTS

JP 10-272970 A 10/1998
JP 10-278664 A 10/1998

(Continued)

OTHER PUBLICATIONS

Extended European Search Report in corresponding European Application No. 12188919.0 dated Dec. 7, 2012.

(Continued)

Primary Examiner — Ryan Kwiecinski
(74) Attorney, Agent, or Firm — Knobbe Martens Olson & Bear LLP

(57) ABSTRACT

A vehicle seat comprising a pair of side frames configuring a portion of a seatback frame serving as framework for a seatback; a deformation origin portion provided to at least one of the pair of side frames and acting as an origin when the side frame deforms due to a collision force imparted to the seatback frame during a rear-on collision; and a deformation suppression unit provided to the side frame provided with the deformation origin portion, permitting deformation of the side frame originating at the deformation origin portion and suppressing deformation of the side frame by a reference amount or greater by the deformation suppression unit making contact with a contacted member provided to the seatback frame when the deformation amount of the side frame has reached the reference amount.

8 Claims, 7 Drawing Sheets

(56) References Cited

U.S. PATENT DOCUMENTS

2013/0119724 A1* 5/2013 Adachi et al. ............ 297/216.14
2014/0103626 A1* 4/2014 Seki et al. .................. 280/730.2

FOREIGN PATENT DOCUMENTS

| JP | 2005-126053 | 5/2005 |
|---|---|---|
| JP | 2006-347436 | 12/2006 |

OTHER PUBLICATIONS

Notice of Reasons for Rejection mailed Jun. 18, 2013 in corresponding Japanese Patent Application No. 2011-234137.

* cited by examiner

VEHICLE SEAT

CROSS-REFERENCE TO RELATED APPLICATION

This application claims priority under 35 USC 119 from Japanese Patent Application No. 2011-234137 filed on Oct. 25, 2011, the disclosure of which is incorporated by reference herein.

BACKGROUND OF THE INVENTION

1. Technical Field

The present invention relates to a vehicle seat equipped with a side frame provided with a deformation origin portion.

2. Related Art

Vehicle seats are known in which a groove portion (a deformation origin portion) is provided to a side frame configuring part of a seatback frame. As illustrated in for example FIG. 2 of Japanese Patent Application Laid-Open (JP-A) No. 2006-347436, such a groove portion (deformation origin portion) is provided at a bottom end portion of the side frame and formed in a substantially C-shape open to the vehicle rear side. When collision force is imparted to the seatback frame in a vehicle rear impact, the side frame deforms with the groove portion as the origin, thereby absorbing the collision force applied to the seatback frame. Accordingly, impact force can be suppressed from for example being input to a reclining unit provided to the side frame.

SUMMARY

However, in the above vehicle seat, although the deformation location of the side frame can be set by the groove portion, it is difficult to regulate the amount of deformation in the side frame with only the groove portion. In particular, there is the risk of the side frame snapping if the side frame deforms excessively.

In consideration of the above circumstances, a subject of the present invention is to provide a vehicle seat capable of suppressing excessive deformation of a side frame when collision force is imparted to a seatback frame during a rear-on collision.

A vehicle seat of a first aspect of the present invention includes: a pair of side frames configuring a portion of a seatback frame serving as framework for a seatback; a deformation origin portion provided to at least one of the pair of side frames and acting as the origin in the event that the side frame deforms due to a collision force imparted to the seatback frame during a rear-on collision; and a deformation suppression unit provided to the side frame provided with the deformation origin portion, permitting deformation of the side frame originating at the deformation origin portion and suppressing deformation of the side frame by a reference amount or greater by the deformation suppression unit making contact with a contacted member provided to the seatback frame when the deformation amount of the side frame has reached the reference amount.

In the vehicle seat of the first aspect, the seatback frame is configured including the pair of side frames. The deformation origin portion is provided to at least one of the pair of side frames, and the side frame deforms with the deformation origin portion as the origin in the event that collision force is imparted to the seatback frame during a rear-on collision.

The deformation suppression unit is provided to the side frame provided with the deformation origin portion, and the deformation suppression unit permits deformation of the side frame originating at the deformation origin portion. Accordingly, collision force imparted to the seatback frame can be absorbed since collision energy imparted to the seatback frame during a rear-on collision is used in the deformation of the side frame. Collision force, for example, can accordingly be suppressed from being input into a reclining unit provided to the side frames.

When the deformation amount of the side frame has reached the reference amount, deformation of the side frame is suppressed by the deformation suppression unit contacting the contacted member provided to the seatback frame. Excessive deformation of the side frame can accordingly be suppressed. Moreover, when the deformation suppression unit contacts the contacted member, the collision force imparted to the side frame is also transmitted to the contacted member through the deformation suppression unit. It is accordingly possible to suppress input of collision force to the reclining unit even in such cases.

A vehicle seat of a second aspect of the present invention is the vehicle seat of the first aspect, wherein the deformation suppression unit is coupled to the side frame so as to be capable of relative movement with respect to the side frame to follow deformation of the side frame.

In the vehicle seat of the second aspect, the deformation suppression unit is coupled to the side frame so as to be capable of relative movement with respect to the side frame to follow deformation of the side frame. When the side frame deforms, the deformation suppression unit accordingly relatively moves with respect to the side frame to following the deformation of the side frame. The deformation suppression unit can accordingly be made to reliably contact the contacted member due to the deformation suppression unit moving along a set movement path of the deformation suppression unit.

A vehicle seat of a third aspect of the present invention is the vehicle seat of the first aspect or the second aspect wherein: the deformation suppression unit is coupled to the side frame so as to be capable of turning, and includes an engaging portion engaged with the side frame and a contact portion configured so as to be capable of contacting the contacted member. The deformation suppression unit turns and the contact portion contacts the contacted member due to the engaging portion moving to follow deformation of the side frame.

In the vehicle seat of the third aspect, the deformation suppression unit is coupled to the side frame so as to be capable of turning. The deformation suppression unit is also configured including the engaging portion and the contact portion. The engaging portion is engaged with the side frame, and moves following the deformation of the side frame. The contact portion is also configured so as to be capable of contacting the contacted member. The deformation suppression unit turns and the contact portion contacts the contacted member due to the engaging portion moving.

When the contact portion contacts the contacted member, turning force acts on the deformation suppression unit due to reaction force acting on the deformation suppression unit from the contacted member, enabling deformation of the side frame to be suppressed due to this turning force. Therefore, the stress values acting on the deformation suppression unit and the contacted member are changed by, for example, a length from the turning center of the deformation suppression unit to the engaging portion and a length from the turning center of the deformation suppression unit to the contact portion. The deformation suppression unit can accordingly be easily designed to correspond to the bending strengths of the deformation suppression unit and the contacted member.

A vehicle seat of a fourth aspect of the present invention is the vehicle seat of the third aspect, wherein the length from the turning center of the deformation suppression unit to the engaging portion is set shorter than the length from the turning center of the deformation suppression unit to the contact portion.

In the vehicle seat of the fourth aspect, the length from the turning center of the deformation suppression unit to the engaging portion of the deformation suppression unit is set shorter than the length from the turning center of the deformation suppression unit to the contact portion of the deformation suppression unit. Accordingly, the force acting on the contacted member from the contact portion when the contact portion contacts the contacted member decreases. Deformation of the side frame can accordingly be efficiently suppressed.

A vehicle seat of a fifth aspect of the present invention is the vehicle seat of the third aspect or the fourth aspect, wherein a turning center portion of the deformation suppression unit is fastened to the side frame by a fastening member.

In the vehicle seat of the fifth aspect, the turning center portion of the deformation suppression unit is fastened to the side frame by a fastening member. Deformation of the side frame accordingly starts when collision force imparted to the seatback frame becomes greater than the fastening strength between the deformation suppression unit and the side frame due to the fastening member and the bending strength of the side frame. Collision force imparted to the seatback frame can accordingly be effectively absorbed since collision energy imparted to the seatback frame is used in turning the deformation suppression unit against the fastening force and in deforming the side frame. Collision force can thereby be effectively suppressed from being input to for example the reclining unit.

A vehicle seat of a sixth aspect of the present invention is the vehicle seat of any one of the first aspect to the fifth aspect wherein: the vehicle seat further includes a pair of reclining units respectively provided at bottom end portions of the pair of side frames and supporting the seatback so as to be capable of tilting, and a coupling shaft that couples together the pair of reclining units; and the contacted member is configured by the coupling shaft.

In the vehicle seat of the sixth aspect, the reclining units are respectively provided at the bottom end portions of the pair of side frames, and the reclining units are coupled together by the coupling shaft. The coupling shaft configures the contacted member. Excessive deformation of the side frame can accordingly be suppressed by employing a coupling shaft with a comparatively high bending strength.

A vehicle seat of a seventh aspect of the present invention is the vehicle seat of the sixth aspect, wherein the deformation suppression unit is provided at the bottom end portion of the side frame.

In the vehicle seat of the seventh aspect, a compact sized deformation suppression unit is made possible by providing the deformation suppression unit at the bottom end portion of the side frame.

A vehicle seat of an eighth aspect of the present invention is the vehicle seat of the fifth aspect, wherein the turning center portion of the deformation suppression unit is provided below the deformation origin portion.

In the vehicle seat of the eighth aspect, the rotation path of the deformation suppression unit with respect to the contacted member can be stabilized. The deformation suppression unit can accordingly be even more reliably caused to contact the contacted member.

Advantageous Effects

According to the vehicle seat of the first aspect, excessive deformation of the side frame can be suppressed when collision force is imparted to the seatback frame in a rear-on collision.

According to the vehicle seat of the second aspect, the deformation suppression unit can be made to reliably contact the contacted member.

According to the vehicle seat of the third aspect, the degrees of freedom in design of the deformation suppression unit are widened.

According to the vehicle seat of the fourth aspect, deformation of the side frame can be efficiently suppressed.

According to the vehicle seat of the fifth aspect, for example collision force can be effectively suppressed from being input into the reclining unit that is coupled to the seatback frame.

According to the vehicle seat of the sixth aspect, excessive deformation of the side frame can be suppressed by utilizing the coupling shaft of a reclining mechanism.

According to the vehicle seat of the seventh aspect, a compact size can be achieved for the deformation suppression unit.

According to the vehicle seat of the eighth aspect, the deformation suppression unit can be made to reliably contact the contacted member.

BRIEF DESCRIPTION OF THE DRAWINGS

Exemplary embodiments of the present invention will be described in detail based on the following figures, wherein.

DETAILED DESCRIPTION OF THE INVENTION

Figure 2:
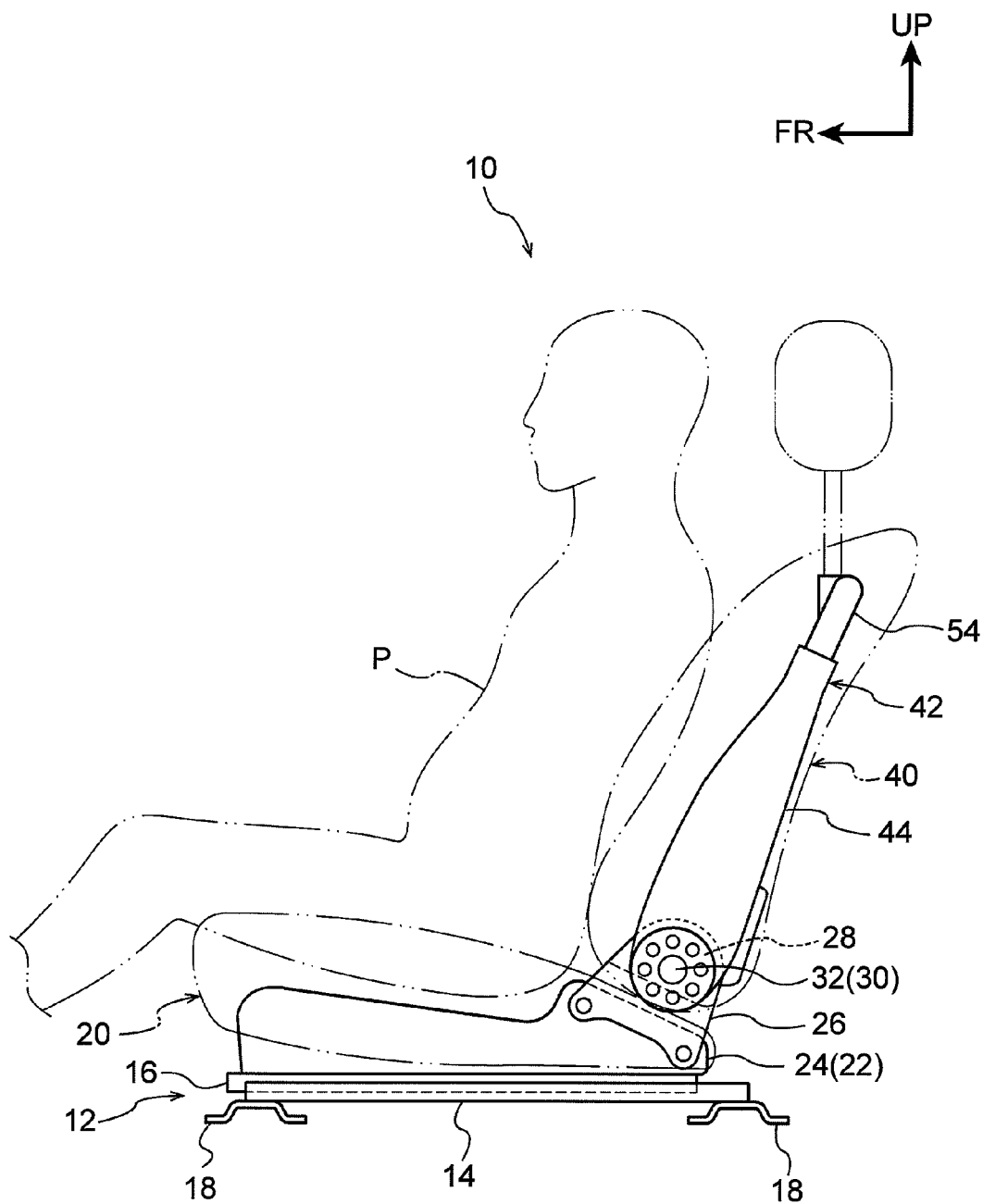
FIG. 2 is a side view of the vehicle seat illustrated in FIG. 1 as viewed from the seat left side.

FIG. 2 is an overall side view as seen from the vehicle left hand side illustrating a vehicle seat 10 according to an exemplary embodiment of the present invention. Note that in the drawings the arrow FR indicates a vehicle front direction, the arrow RH indicates the vehicle right hand side (one vehicle width direction side) and the arrow UP indicates the top, as appropriate.

As shown in FIG. 2, the vehicle seat 10 is configured including a seat cushion 20 for an occupant P to sit on, a seatback 40 for supporting the back of the occupant P, a slide rail 12 for connecting the seat cushion 20 to a vehicle body floor, and a reclining mechanism 30 for supporting the seatback 40 so as to be tiltable with respect to the seat cushion 20.

The slide rail 12 configures the bottom portion of the vehicle seat 10. The slide rail 12 includes a pair of elongated shaped lower rails 14, and the pair of lower rails 14 are disposed parallel to each other along the seat front-rear direction. Vehicle front end portions and vehicle rear end portions of the lower rails 14 are respectively fixed to the vehicle body floor through leg brackets 18. Upper rails 16 are respectively provided inside the respective lower rails 14, and the upper rails 16 are supported so as to be capable of sliding in the seat front-rear direction with respect to the lower rails 14.

The seat cushion 20 is provided above the lower rails 14. The seat cushion 20 is disposed so as to be horizontal or inclined downwards on progression towards the vehicle rear. The occupant P sits on the upper portion of the seat cushion 20. A cushion frame 22 is provided inside the seat cushion 20. The cushion frame 22 configures the framework of the seat cushion 20. The cushion frame 22 includes a pair of cushion side frames 24 at the two seat width direction side portions of the cushion frame 22. The cushion side frames 24 are fixed to the respective upper rails 16.

The vehicle rear direction end portions of the pair of cushion side frames 24 are provided with respective hinge brackets 26. The hinge brackets 26 are made from sheet metal and are formed in substantially triangular shapes. The lower portions of the hinge brackets 26 are fastened to the cushion side frames 24 by fastening members such as bolts and nuts, not shown in the drawings. Assembly portions 28 are provided at upper portions of the hinge brackets 26 for assembling recliners 32 of the reclining mechanism 30, described below.

Figure 1:
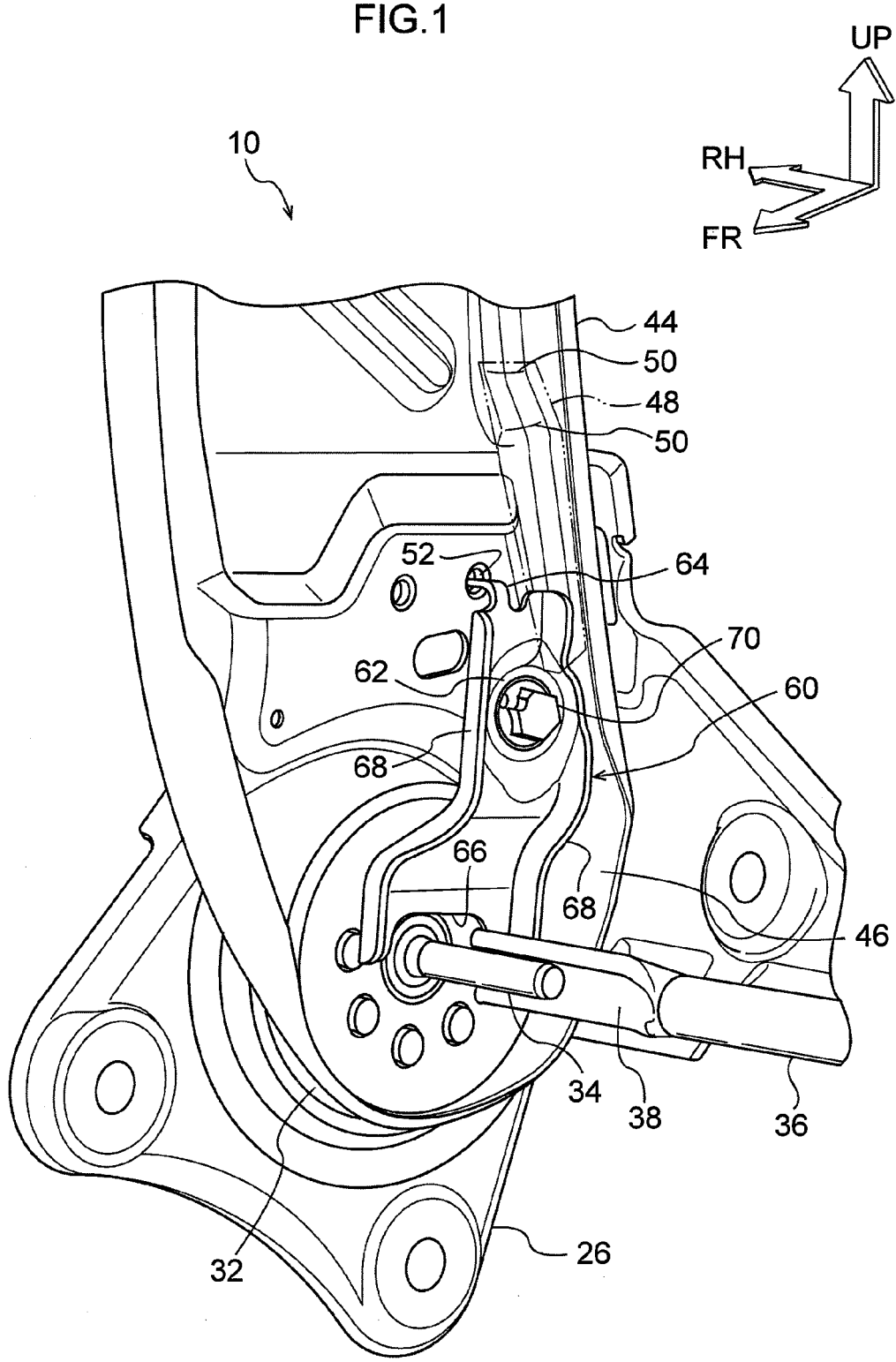
FIG. 1 is a perspective view illustrating a vehicle right-hand bottom end portion of a seatback frame employed in a vehicle seat according to an exemplary embodiment of the present invention.

As shown in FIG. 1, the reclining mechanism 30 is configured including a pair of the recliners 32, serving as reclining units, and a connecting rod 36 serving as a contacted member and a coupling shaft. Note that only the vehicle right hand side recliner 32 is shown in FIG. 1.

The recliner 32 is formed in a substantially circular disk shape, and is disposed between the hinge bracket 26 and the lower end portion of back side frame 44, described later, coupling the hinge bracket 26 and the back side frame 44 together. The recliners 32 are configured to support the seatback 40 so as to be capable of tilting, described later, and to enable the tilt angle of the seatback 40 to be adjusted with respect to the seat cushion 20. A shaft shaped coupling shaft 34 is provided at a central portion of each of the recliners 32. The coupling shafts 34 project out from the recliners 32 towards a vehicle width direction inside (in the direction along which the pair of recliners 32 face each other).

The connecting rod 36 is manufactured from metal pipe material. The connecting rod 36 is provided so as to extend along the vehicle width direction between the pair of recliners 32 and is coaxially disposed to the coupling shafts 34. Coupling portions 38 are respectively provided at two vehicle width direction end portions of the connecting rod 36. The coupling portions 38 is formed into a substantially C-shape in cross-section, such as by press forming. The coupling portion 38 is joined to the coupling shaft 34 of the recliner 32, such as by welding, thereby coupling together the pair of recliners 32.

The reclining mechanism 30 is equipped with a known lock mechanism (not shown in the drawings), and the seatback 40 is retained at an adjusted position by the lock mechanism locking (restraining) the seatback 40, described later, such that the seatback 40 cannot be tilted.

As shown in FIG. 2, the seatback 40 is provided in an upright state at the vehicle rear end portion of the seat cushion 20. A seatback frame 42 is provided inside the seatback 40, and the seatback frame 42 configures the framework of the seatback 40.

As shown in FIG. 1, the pair of back side frames 44, serving as side frames, are provided at two vehicle width direction side portions of the seatback frame 42. The back side frame 44 is manufactured from a high tensile steel plate, and is provided running along a substantially top-bottom direction. The recliners 32 are provided at bottom end portions of the back side frames 44, and the seatback 40 (the seatback frame 42) is thereby capable of being tilted by the recliners 32 about an axial center of the connecting rod 36.

Figure 3:
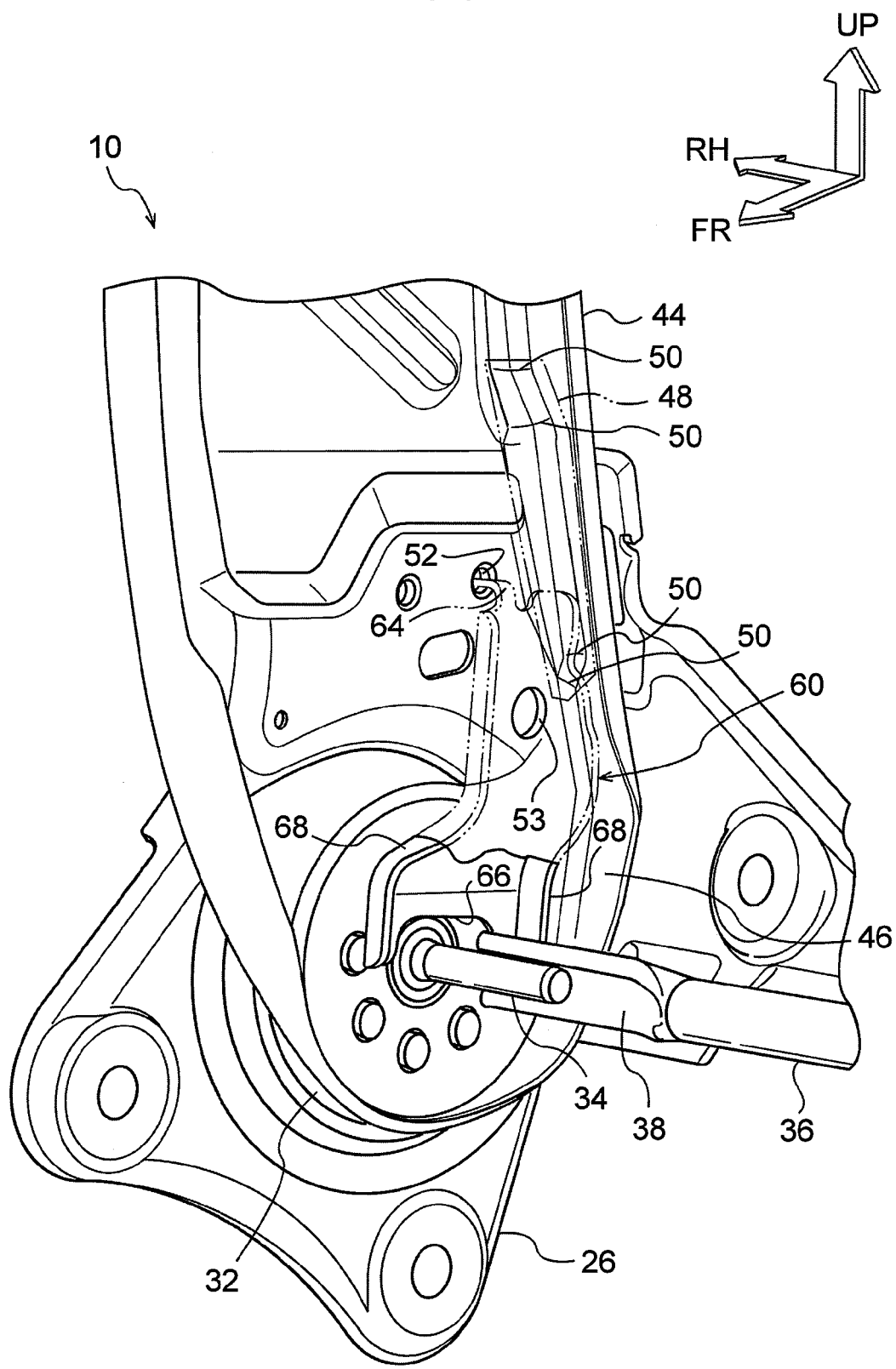
FIG. 3 is a perspective view of the vehicle right-hand bottom end portion of a seatback frame illustrated in FIG. 1 with a portion of an inner bracket shown in a cut-away state.

As shown in FIG. 3, an outer peripheral wall 46 is integrally provided to outer peripheral portion of the back side frame 44 at locations excluding at top end portion. The outer peripheral wall 46 projects out from the back side frame 44 towards the vehicle width direction inside (the direction along which the pair of back side frames 44 face each other).

A weakened portion 48 (the portion surrounded by the double dot intermittent line in FIG. 3), serving as a deformation origin portion, is provided at a bottom end portion of each of the back side frames 44, a vehicle rear direction portion of the boundary portion between the outer peripheral wall 46 and the back side frames 44. Bend ridges 50 are formed at four locations in the weakened portion 48, and the weakened portion 48 is formed so as to project out towards the vehicle rear direction.

When collision force (collision load) is imparted to the seatback frame 42 during a rear impact to the vehicle, the collision force acts on the back side frame 44 towards the vehicle rear. Due to the bend ridges 50 described above being formed at the bottom end portion of the back side frame 44, stress in the back side frame 44 arising from the collision force is concentrated at the locations of each of the bend ridges 50. Due to the back side frame 44 being configured so as to readily bend at the locations of the bend ridges 50 in the weakened portion 48, the back side frame 44 deforms towards the vehicle rear (an arrow A direction in FIG. 4) with the weakened portion 48 as the origin when a vehicle rear collision force (collision load) is imparted to the seatback frame 42.

Circular shaped engaged holes 52 (elements falling within the broad definition of engaged portions) are formed through the back side frames 44 at the vehicle front of the weakened portions 48. Insertion holes 53 are also formed through the back side frames 44 below the engaged holes 52. Fastening bolts 70 for fastening inner brackets 60, described later, to the back side frames 44 are inserted inside the insertion holes 53 (see FIG. 1). Note that the insertion holes 53 are disposed below the weakened portions 48. Weld nuts, not shown in the drawings, are fixed at the vehicle width direction outside faces of the back side frames 44, and the weld nuts are coaxially disposed to the insertion holes 53.

As shown in FIG. 2, an upper frame 54 is also provided to an upper portion of the seatback frame 42. The upper frame 54 is formed in an inverted substantially U-shape as viewed from the vehicle front. The two end portions of the upper frame 54 are joined to the upper portion of the back side frames 44 such as by welding.

Figure 4:
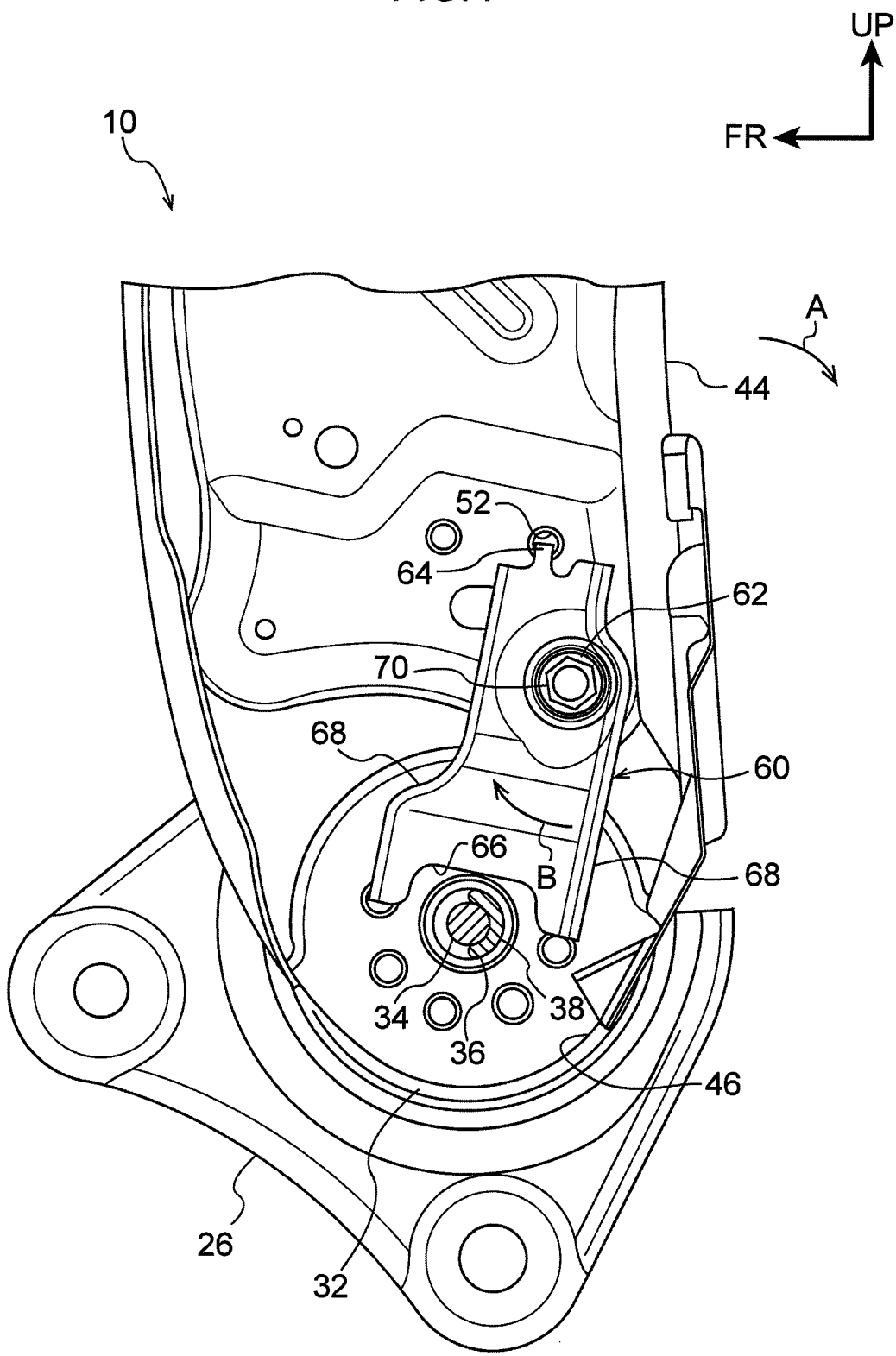
FIG. 4 is a partially cut-away side view of the vehicle right-hand bottom end portion of a seatback frame illustrated in FIG. 1, as viewed from the vehicle width direction inside.

Explanation follows regarding the pair of inner brackets 60 that serve as a deformation suppression unit that is an essential part of the present invention. As shown in FIG. 1 and FIG. 4, the inner brackets 60 are respectively provided at the vehicle width direction insides of the pair of back side frames 44 (the direction along which the back side frames 44 face each other) and above the connecting rod 36 of the reclining mechanism 30. The inner bracket 60 is manufactured from sheet metal and is formed in a substantially rectangular shape when viewed from the side. Note that only the vehicle right hand side inner bracket 60 is shown in FIG. 1 and FIG. 4.

A fastening portion 62 is provided at a substantially central portion of each of the inner brackets 60. The fastening portion 62 is formed in indented shapes projecting out from the inner bracket 60 to the back side frame 44 side. A fastening hole, not shown in the drawings, is formed through a central portion of the fastening portion 62, disposed so as to be coaxial to the insertion hole 53 of the back side frame 44. Each of the fastening bolts 70, serving as fastening members, is inserted inside the respective fastening hole and insertion hole 53, and the fastening bolts 70 are screwed into the weld nuts. The inner brackets 60 are accordingly fastened (coupled) to the back side frames 44 by the fastening bolts 70.

Hook portions 64, serving as engaging portions, are provided at a top end portion (first end portion) of the inner brackets 60. The hook portions 64 bend towards sides of the back side frames 44, and are inserted into the engaged holes 52 of the back side frames 44. The top end portions of the inner brackets 60 are thereby rotatably engaged to the back side frames 44.

Groove portions 66, serving as contact portions, are provided in bottom end portions (second end portions) of the inner brackets 60. The groove portion 66 is formed in an inverted substantially U-shape as viewed from the side, opening downwards. The connecting rod 36 of the reclining mechanism 30 is disposed in the groove portions 66.

Under normal circumstances the inner brackets 60 are fastened (coupled) to the back side frames 44 so as not be able to turn, due to the inner brackets 60 being fastened to the back side frames 44 by the fastening bolts 70. However, the engaged hole 52 of the back side frame 44 is displaced towards the vehicle rear when the back side frame 44 deforms towards the vehicle rear with deformation origins at the weakened portion 48. Configuration is made such that the hook portion 64 of the inner bracket 60 moves to follow displacement of the engaged hole 52, and the inner bracket 60 relatively turns (moves) with respect to the back side frame 44 about the fastening bolt 70 in an arrow B direction in FIG. 4. Moreover, the vehicle rear direction portion of the inner peripheral portion of the groove portion 66 is set so as to make contact with the outer peripheral portion of the coupling portion 38 of the connecting rod 36 when the displacement amount of the back side frame 44 reaches a reference amount (when the displacement amount of the engaged hole 52 reaches a reference amount) (see FIG. 5). Note that the position of the engaged hole 52 prior to displacement is indicated by the double dot intermittent lines in FIG. 5.

Figure 5:
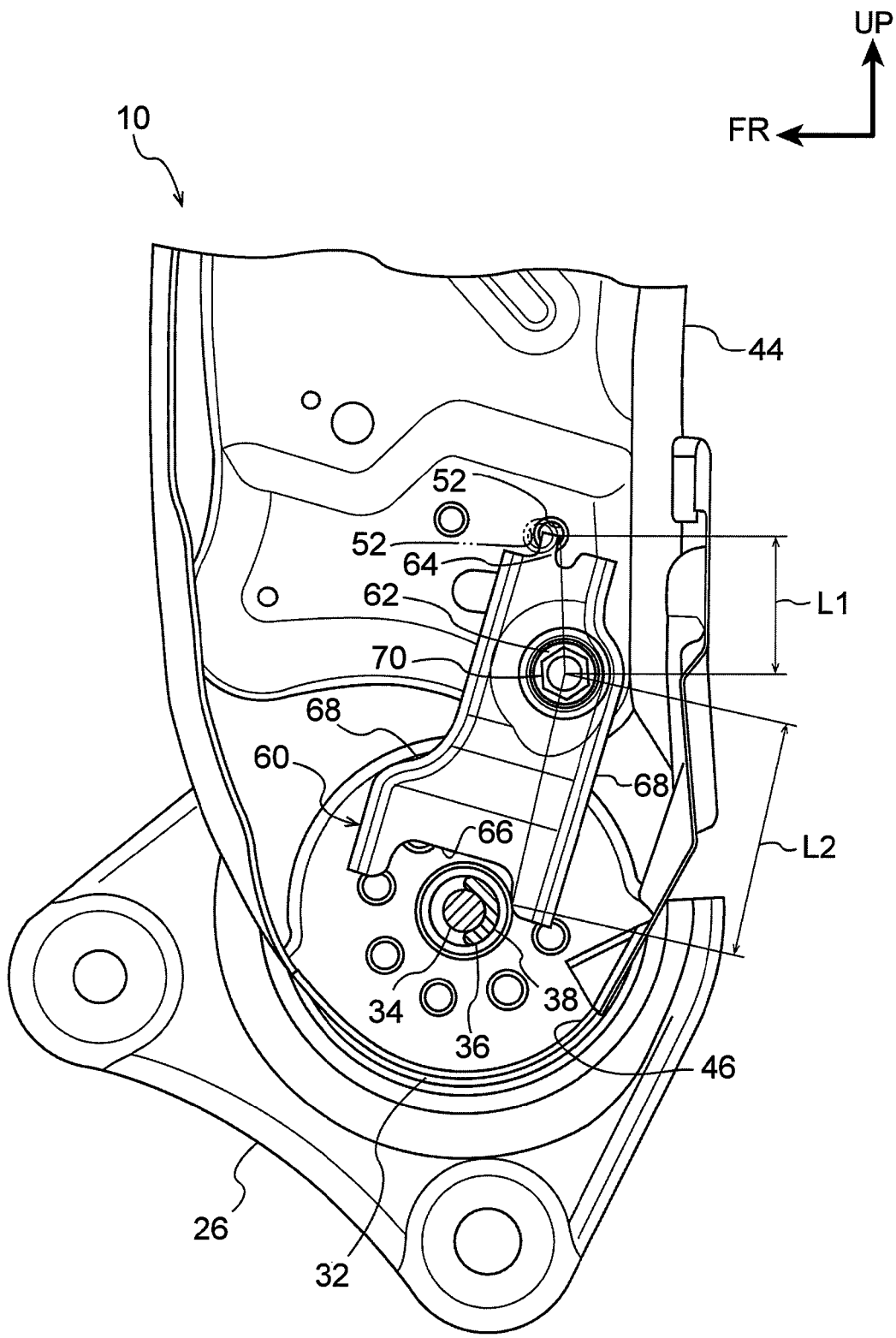
FIG. 5 is a side view of a vehicle right-hand bottom end portion of a seatback frame wherein the seatback frame has deformed in a vehicle rear impact, as viewed from the vehicle width direction inside.

As shown in FIG. 5, a length L1 from the turning center of the inner bracket 60 (the central axis of the fastening bolt 70) to the hook portion 64 (the contact location at the hook portion 64 with the engaged hole 52) is set to be shorter than a length L2 from the turning center of the inner bracket 60 to the contact location of the groove portions 66 with the connecting rod 36.

A flange portion 68 is also integrally provided at the outer peripheral portion of each of the inner brackets 60, apart from at portions at the top end portion and the bottom end portion of the inner bracket 60. The flange portion 68 projects out from the inner bracket 60 to the opposite side to the back side frame 44 side, thereby securing the strength of the inner brackets 60.

Explanation follows regarding the operation and advantageous effects of the present exemplary embodiment.

In the vehicle seat 10 configured as described above, when the vehicle has been impacted from the vehicle rear by another vehicle (when the vehicle has been involved in a rear-on collision) or when the vehicle has impacted for example another vehicle when travelling backwards, a force due to inertia acts on the occupant P towards the vehicle rear. When this occurs, a collision force (collision load) towards the vehicle rear is imparted from the occupant P to the seatback 40 (the seatback frame 42) due to the occupant P moving towards a seatback 40 side (the vehicle rear) under the force due to inertia. This collision force is transmitted to (acts on) the back side frame 44.

Due to the bend ridges 50 being provided to the back side frame 44 at the locations of the weakened portion 48, stress arising in the back side frames 44 from the collision force is concentrated at the location of each of the bend ridges 50. The back side frame 44 accordingly attempts to deform towards the vehicle rear (in the arrow A direction of FIG. 4) about the weakened portions 48 as the origin.

The hook portion 64 of the inner brackets 60 is also engaged in the engaged hole 52 of the back side frame 44 due to the inner bracket 60 being fastened to the back side frame 44 by the fastening bolt 70. Hence, when the back side frame 44 attempts to deform towards the vehicle rear about the weakened portion 48 as the origin, the engaged hole 52 also attempts to displace towards the vehicle rear to accompany this deformation. The inner peripheral portion of the engaged hole 52 therefore contacts the hook portion 64, and the collision force is transmitted from the engaged hole 52 to the hook portion 64 (the inner bracket 60).

Deformation of the back side frame 44 about the weakened portion 48 as the origin then starts in a case that the collision force acting on the back side frames 44 becomes larger than the fastening force between the inner bracket 60 and the back side frame 44 due to the fastening bolt 70 and the bending strength of the back side frame 44.

When this occurs, the main deformation occurs in a portion of the back side frame 44 from vehicle front direction portion toward upper portion of the weakened portion 48. In other words hardly any deformation occurs in portion of the back side frame 44 from the vehicle front portion of the weakened portions 48 downwards. Since the engaged holes 52 displace towards the vehicle rear accompanying the deformation when the back side frame 44 deforms, the hook portion 64 of the inner bracket 60 is moved towards the vehicle rear so as to follow displacement of the engaged hole 52. The inner bracket 60 is accordingly turned in the arrow B direction of FIG. 4 about the fastening bolt 70.

When the displacement amount of the back side frame 44 reaches the reference amount (when the displacement amount of the engaged hole 52 reaches the reference amount) the vehicle rear direction portion of the inner peripheral portion of the groove portion 66 contacts the outer peripheral portion of the coupling portion 38 of the connecting rod 36. The back side frame 44 is accordingly supported by the inner brackets 60 and the connecting rod 36, thereby suppressing deformation of the back side frame 44.

The inner bracket 60 is provided to the back side frame 44 in the manner described above. The inner bracket 60 also turns to follow deformation of the back side frame 44 when the collision force towards the vehicle rear is imparted to the seatback frame 42 and the back side frame 44 deforms. Deformation of the back side frame 44 with the weakened portion 48 as the origin is accordingly permitted. The collision energy imparted to the seatback frame 42 during a rear impact is hence employed to deform the back side frame 44, thereby enabling the collision force imparted to the seatback frame 42 to be absorbed. Accordingly, the collision force input to the recliners 32 can be suppressed (reduced).

The groove portion 66 of the inner bracket 60 also contacts the connecting rod 36 of the reclining mechanism 30 when the displacement amount of the back side frame 44 has reached the reference amount (when the displacement amount of the engaged hole 52 has reached the reference amount), thereby suppressing deformation of the back side frame 44. The back side frame 44 can accordingly be suppressed from deforming too much. Moreover, when the back side frame 44 have made contact with the connecting rod 36, the collision force imparted (transmitted) to the back side frame 44 is also transmitted to the connecting rod 36 through the inner bracket 60. The collision force input to the recliner 32 can accordingly be suppressed (reduced) in such cases. Thus as explained above, the back side frame 44 can accordingly be suppressed from deforming excessively when collision force is imparted to the seatback frame 42 during a rear impact.

The inner bracket 60 is also fastened (coupled) to the back side frame 44 such that relative movement (turning) is possible, and the inner bracket 60 moves (turns) about the fastening bolt 70 to follow deformation of the back side frame 44. The groove portion 66 accordingly moves (turns) along the set movement (turning) path of the inner bracket 60 when the back side frame 44 deforms, and so the inner peripheral portion of the groove portions 66 can be reliably caused to contact the outer peripheral portion of the connecting rod 36.

The hook portion 64 of the inner bracket 60 is engaged in the engaged hole 52 of the back side frame 44 and moves to follow deformation of the back side frame 44. The inner bracket 60 are turned by the movement of the hook portion 64 of the inner bracket 60, and the groove portion 66 makes contact with the connecting rod 36.

A turning force acts on the inner bracket 60 due to the reaction force from the connecting rod 36 acting on the inner bracket 60 when the inner peripheral portion of the groove portion 66 contacts the outer peripheral portion of the connecting rod 36. Deformation of the back side frame 44 can hence be suppressed by the turning force. Since the stress value acting on the inner brackets 60 and the connecting rod 36 is changed according to the length L1 from the turning center of the inner bracket 60 to the hook portion 64 and by the length L2 from the turning center of the inner bracket 60 to the groove portion 66, the inner bracket 60 can be easily designed to correspond to the bending strengths of the inner bracket 60 and the connecting rod 36.

The length L1 from the turning center of the inner bracket 60 to the hook portion 64 is also set shorter than the length L2 from the turning center of the inner bracket 60 to contact location of the groove portion 66 with the connecting rod 36. The force acting from the groove portion 66 (the inner brackets 60) to the connecting rod 36 when the groove portion 66 of the inner bracket 60 contacts the connecting rod 36 can accordingly be made small. Deformation of the back side frame 44 can accordingly be efficiently suppressed.

The inner bracket 60 is fastened to the back side frame 44 by the fastening bolt 70. Hence deformation of the back side frame 44 starts when the collision force transmitted to the back side frame 44 becomes larger than the fastening force between the inner bracket 60 and the back side frame 44 due to the fastening bolt 70 and the bending strength of the back side frame 44. Namely, the collision energy imparted to the seatback frame 42 is employed to turn the inner bracket 60 against the fastening force and to deform the back side frame 44, enabling the collision force imparted to the seatback frame 42 to be efficiently absorbed. The collision force can accordingly be effectively suppressed from being input to the recliner 32.

Moreover, the groove portion 66 of the inner bracket 60 makes contact with the connecting rod 36. The connecting rod 36 of comparatively high bending strength is employed to enable deformation of the back side frames 44 to be suppressed from becoming excessive. Moreover, due to the back side frame 44 tilting about an axis of rotation of the connecting rod 36, there is no change in the relative position of the connecting rod 36 with respect to the back side frame 44 even though the back side frame 44 tilts with respect to the seat cushion 20. Design of the inner bracket 60 can accordingly be made yet easier.

The inner bracket 60 is also provided at bottom end portion of the back side frame 44. The inner bracket 60 can be made compact since the separation distance from the hook portion 64 of the inner bracket 60 to the groove portions 66 can accordingly be made short.

The groove portion 66 of the inner bracket 60 is formed in the inverted U-shape as viewed from the side, and the connecting rod 36 is disposed inside the groove portion 66. Consequently, even when the back side frame 44 deforms during a vehicle frontal impact, the inner bracket 60 turns in the opposite direction to the arrow B direction in FIG. 4 about an axial center of the fastening bolt 70, and the vehicle front direction portion of the inner peripheral portion of the groove portion 66 contacts the connecting rod 36. The inner bracket 60 can accordingly be caused to also make contact with the connecting rod 36 during a vehicle frontal impact, enabling the movement amount of the seatback 40 towards the vehicle front to be suppressed in a vehicle frontal impact.

The insertion hole 53 (the fastening bolt 70) is disposed below the weakened portion 48. This means that the position of the turning center of the inner bracket 60 is substantially unchanged during deformation of the back side frame 44, and so the rotation path of the inner bracket 60 with respect to the connecting rod 36 can be stabilized. The inner bracket 60 can accordingly be even more reliably caused to contact the connecting rod 36.

Note that the present exemplary embodiment is configured such that when the back side frame 44 deforms with the weakened portion 48 as the origin, the hook portion 64 of the inner bracket 60 moves to follow displacement of the engaged hole 52 of the back side frame 44. Alternatively, when the back side frame 44 deforms with the weakened portion 48 as the origin, the hook portions 64 may be configured such that the inner bracket 60 turns about the fastening bolt 70 while the hook portion 64 are being pulled out slightly from the engaged hole 52. The inner bracket 60 can accordingly be caused to relatively turn with respect to the back side frame 44 even in a case that the engaged holes 52 is displaced while making the length from the turning center of the inner bracket 60 to the position of the engaged holes 52 after deformation longer than the length L1 from the turning center of the inner bracket 60 to the hook portions 64.

Figure 6:
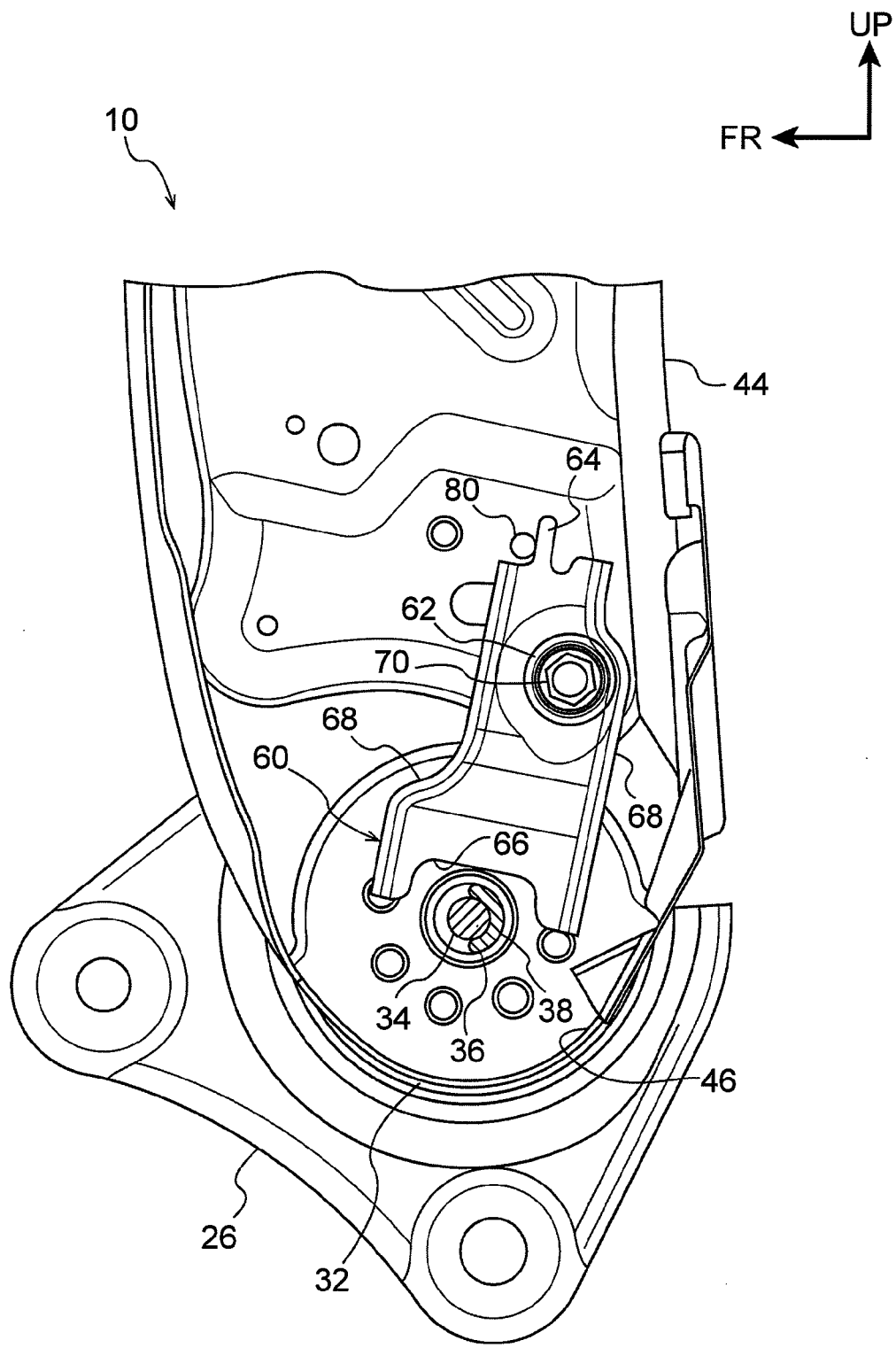
FIG. 6 is a partially cut-away side view of an inner bracket fastened to the seatback frame illustrated in FIG. 1, as viewed from the vehicle width direction inside.

In the present exemplary embodiment the hook portion 64 of the inner bracket 60 is inserted into the engaged hole 52 of the back side frame 44 to engage the top end portions of the inner bracket 60 and the back side frame 44 with each other. However, engagement between the top end portion of the inner bracket 60 and the back side frame 44 is not limited thereto. For example, as shown in FIG. 6, the bends in the hook portion 64 may be omitted, and configuration may be made with a protruding portion 80 that projects out towards the vehicle width direction inside provided to the back side frame 44 in place of the engaged hole 52, and with the protruding portion 80 disposed at the side of the hook portion 64 and with the protruding portion 80 in a state of contact to the hook portion 64. By adopting such a configuration, similarly to as described above, the inner bracket 60 can be made to turn relative to the back side frame 44 even when the protruding portion 80 displaces by making the length from the turning center of the inner bracket 60 to the position of the protruding portion 80 after deformation longer than the length L1 from the turning center of the inner bracket 60 to the hook portions 64.

Figure 7:
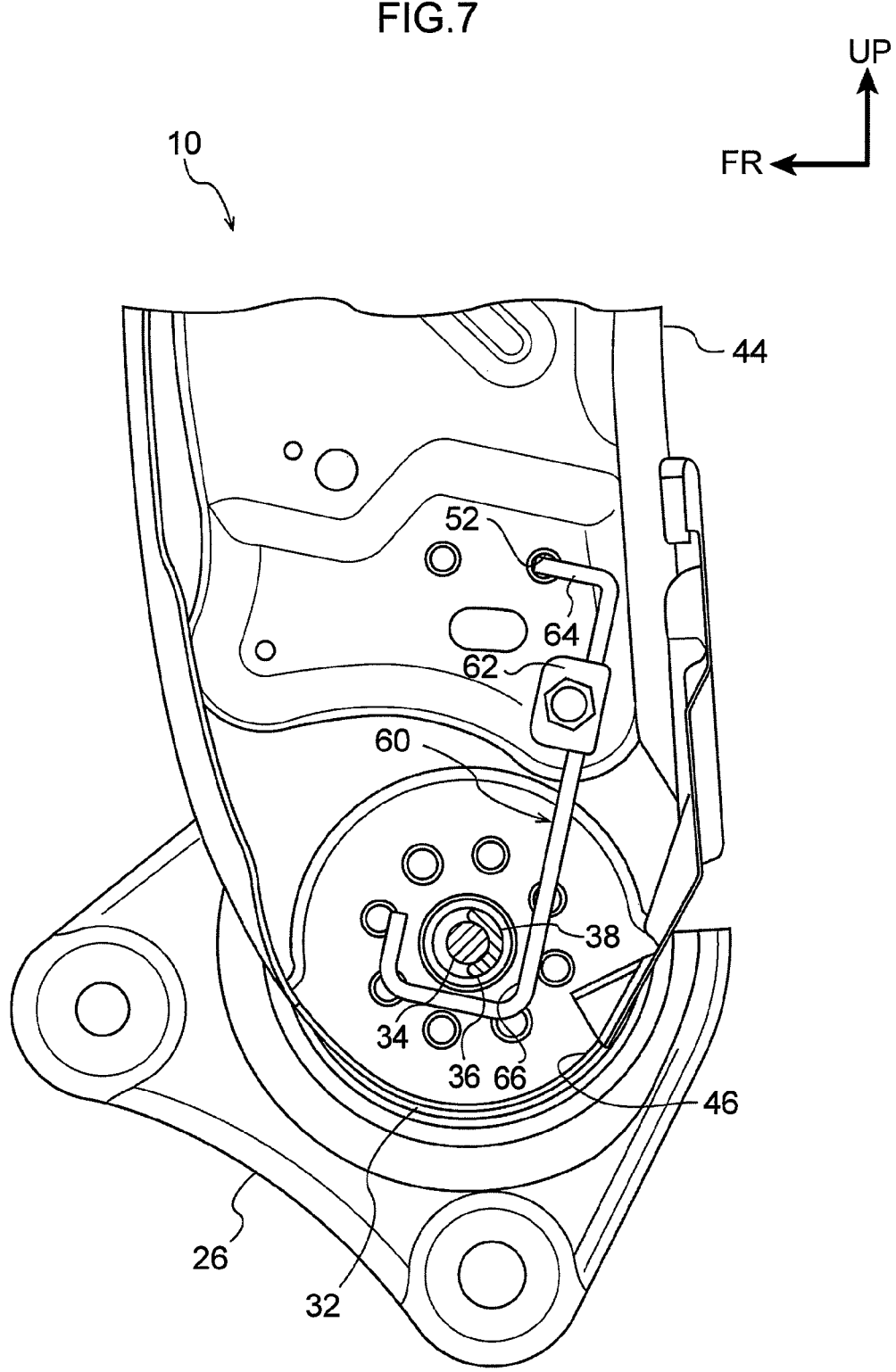
FIG. 7 is a partially cut-away side view of an inner bracket fastened to the seatback frame illustrated in FIG. 1, as viewed from the vehicle width direction inside.

Furthermore, in the present exemplary embodiment, the inner bracket 60 is manufactured from a metal sheet. Alternatively, as shown in FIG. 7, the inner brackets 60 may be manufactured from metal bar material. In such cases, the fastening portion 62 may be formed by press forming the metal bar material, and the bar material may be bent into a U-shape to form the groove portion 66.

In the present exemplary embodiment the inner bracket 60 is fastened to the back side frame 44 by the fastening bolt 70, however the inner bracket 60 may be axially supported from the back side frame 44 so as to be capable of turning.

Moreover, whereas in the present exemplary embodiment the groove portion 66 of the inner bracket 60 is configured so as to be capable of contacting the outer peripheral portion of the connecting rod 36, the members contacted by the groove portions 66 of the inner brackets 60 are not limited thereto. For example, the groove portions 66 of the inner bracket 60 may be configured so as to make contact with the cushion frame 22.

Whereas in the present exemplary embodiment the inner brackets 60 are respectively provided to the pair of back side frames 44, configuration may be made such that the inner bracket 60 is provided only to one or other of the pair of back side frames 44. For example, when the reclining mechanism 30 is configured such that the seatback 40 is tilted with respect to the seat cushion 20 by driving with a motor, in what is referred to as power reclining, configuration may be made with the inner bracket 60 disposed on the back side frames 44 on the side where the motor is not disposed, since generally such a motor is disposed at the vehicle width direction inside of the back side frames 44.

Whereas in the present exemplary embodiment the inner brackets 60 are applied to the vehicle seat 10 equipped with the reclining mechanism 30, the inner brackets 60 may also be applied to a vehicle seat 10 in which the reclining mechanism 30 is dispensed with. In such cases, a coupling pipe for coupling the back side frames 44 and the cushion side frames 24 together can be provided in the position of the connecting rod 36, and the groove portions 66 of the inner brackets 60 configured so as to be capable of contacting the coupling pipe.

In the present exemplary embodiment, since it is the vehicle rear direction portions of the groove portions 66 of the inner brackets 60 that make contact with the connecting rod 36, the vehicle front direction portion of the groove portions 66 of the inner brackets 60 may be dispensed with. The inner brackets 60 can thereby be made even more compact.

Moreover, in the present exemplary embodiment the back side frames 44 are manufactured from a high tensile steel plate. Alternatively the back side frames 44 may be manufactured using an ordinary rolled steel plate.

What is claimed is:

1. A vehicle seat comprising:
    a pair of side frames configuring a portion of a seatback frame serving as framework for a seatback;
    a deformation origin portion provided to a first side frame which is one of the pair of side frames and acting as an origin when the first side frame deforms due to a collision force imparted to the seatback frame during a rear-on collision; and
    a deformation suppression unit provided to the first side frame provided with the deformation origin portion, permitting deformation of the first side frame originating at the deformation origin portion and suppressing deformation of the first side frame by a reference amount or greater by the deformation suppression unit making contact with a contacted member provided to the seatback frame when the deformation amount of the first side frame has reached the reference amount, wherein:
    the deformation suppression unit is coupled to the first side frame so as to be capable of turning, and comprises an engaging portion engaged with the first side frame and a contact portion configured so as to be capable of contacting the contacted member; and
    the deformation suppression unit turns and the contact portion contacts the contacted member due to the engaging portion moving to follow deformation of the first side frame.

2. The vehicle seat of claim 1, wherein the deformation suppression unit is coupled to the first side frame so as to be capable of relative movement with respect to the first side frame to follow deformation of the first side frame.

3. The vehicle seat of claim 1, wherein a length from a turning center of the deformation suppression unit to the engaging portion is set shorter than a length from the turning center of the deformation suppression unit to the contact portion.

4. The vehicle seat of claim 1, wherein a turning center portion of the deformation suppression unit is fastened to the first side frame by a fastening member.

5. The vehicle seat of claim 4, wherein the turning center portion of the deformation suppression unit is provided below the deformation origin portion.

6. The vehicle seat of claim 1, wherein:
    the vehicle seat further comprises
        a pair of reclining units respectively provided at bottom end portions of the pair of side frames and supporting the seatback so as to be capable of tilting, and
        a coupling shaft that couples together the pair of reclining units; and
        the coupling shaft is configured as the contacted member.

7. The vehicle seat of claim 6, wherein the deformation suppression unit is provided at the bottom end portion of the first side frame.

8. The vehicle seat of claim 1, wherein the contact portion of the deformation suppression unit is disposed at lower side of a turning center of the deformation suppression unit.

* * * * *